United States Patent
Liang (10) Patent No.: US 7,352,413 B2
(45) Date of Patent: Apr. 1, 2008

(54) MULTIFUNCTIONAL REMOTE CONTROL DEVICE

(76) Inventor: Hsien-Rong Liang, P.O. Box No. 6-57, Junghe, Taipei 235 (TW)

( * ) Notice: Subject to any disclaimer, the term of this patent is extended or adjusted under 35 U.S.C. 154(b) by 139 days.

(21) Appl. No.: 10/439,227

(22) Filed: May 16, 2003

(65) Prior Publication Data

US 2004/0227859 A1 Nov. 18, 2004

(51) Int. Cl.
*H04N 5/44* (2006.01)

(52) U.S. Cl. ..................................... 348/734

(58) Field of Classification Search ............... 348/734, 348/725; 725/153; 340/825.72, 825.29, 340/825.22, 825.69; 341/176; *H04N 5/44*
See application file for complete search history.

(56) References Cited

U.S. PATENT DOCUMENTS 6,636,272 B1 * 10/2003 Noguchi et al. ............ 348/734
6,968,570 B2 * 11/2005 Hayes et al. ................ 348/734
6,981,276 B2 * 12/2005 Terakado et al. ........... 348/725

\* cited by examiner

*Primary Examiner*—Sherrie Hsia (57) ABSTRACT

The present invention provides a multifunctional remote control device. It characterizes that after a memory card is inserted in a memory card slot, a memory card control circuit instantly reads the audio/visual data in the memory card. Meanwhile a control button on a panel keyboard directs the commands to a control circuit through a panel circuit. The control circuit drives the memory card control circuit to send audio/visual data to a coding circuit which translates the data to wireless signals. The wireless signals are then sent by a transmitter and picked up by the receiving device of the receiver. A power source joint disposed at the rear side of the receiver is for the power supply. The panel keyboard sends audio/visual viewing commands such as forwarding, rewarding and volume through the control circuit.

8 Claims, 8 Drawing Sheets

MULTIFUNCTIONAL REMOTE CONTROL DEVICE

BACKGROUND OF THE INVENTION

1) Field of the Invention

The present invention relates to a multifunctional remote control device, more particularly to a memory card control circuit thereof instantly reads the audio/visual data in the memory card after a memory card is being inserted in the memory card slot.

2) Description of the Prior Art

Figure 1:
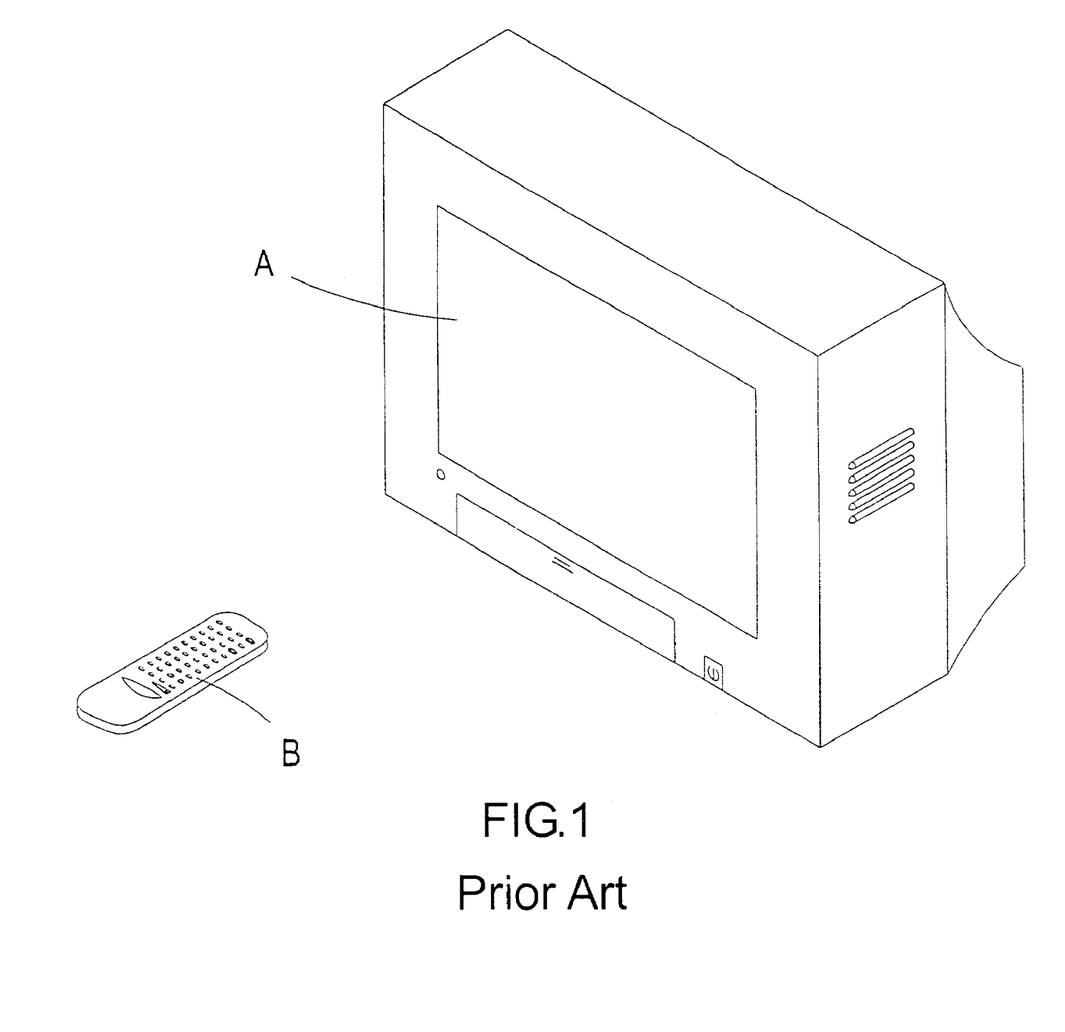
FIG. 1 is a schematic drawing of the conventional television set and remote control.

As shown in FIG. 1, the functions of the conventional remote control (B) are limited in volume control and channel switching of the television set (A). However, it is the era of information digitalization. Most of the image and music are digitalized. However, a digital product, digital camera for example, needs to be connected to a computer when viewing the files inside, which is very inconvenient.

SUMMARY OF THE INVENTION the object of the present invention is to applied to The present invention relates to a multifunctional remote control device. The object of the present invention is to applied to a memory card control circuit thereof instantly reads the audio/visual data in the memory card after a memory card is being inserted in the memory card slot. Meanwhile the control button on the panel keyboard directs the commands to a control circuit through a panel circuit. Said control circuit drives the memory card control circuit to send audio/visual data to a coding circuit which translates said data to wireless signals. The wireless signals are then sent by a transmitter and picked up by the receiving device of the receiver. A decoding thereof circuit translates the wireless signals into audio/visual data and inputs the data to a coding circuit which translates the data to TV signals receivable by the television set. Said TV signals are input to the television set through signal joint at the rear side of the receiver and output from the screen and speakers. A power source joint also disposed at the rear side of the receiver is for the power supply. Said panel keyboard sends audio/visual viewing commands such as forwarding, rewarding and volume through the control circuit.

To enable a further understanding of the structure and functions of the invention herein, the brief description of the drawings below are followed by detailed description of the most preferred embodiment of the present invention.

BRIEF DESCRIPTION OF THE DRAWINGS

FIG. 3-1 is another perspective drawing of the receiver in the present invention.

DETAILED DESCRIPTION OF THE PREFERRED EMBODIMENTS

Figure 2:
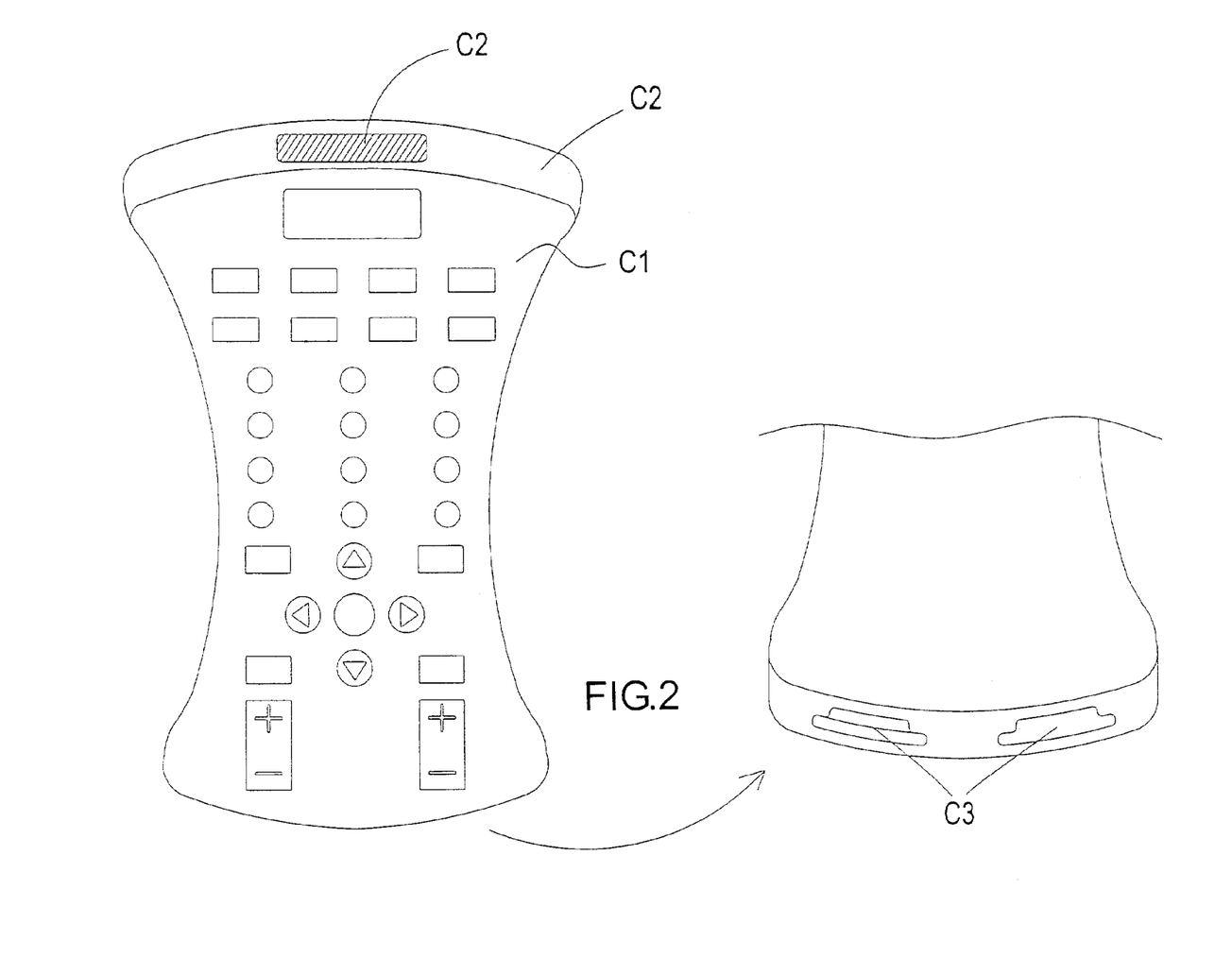
FIG. 2 is a perspective drawing of the remote control device in the present invention.
Figure 3:
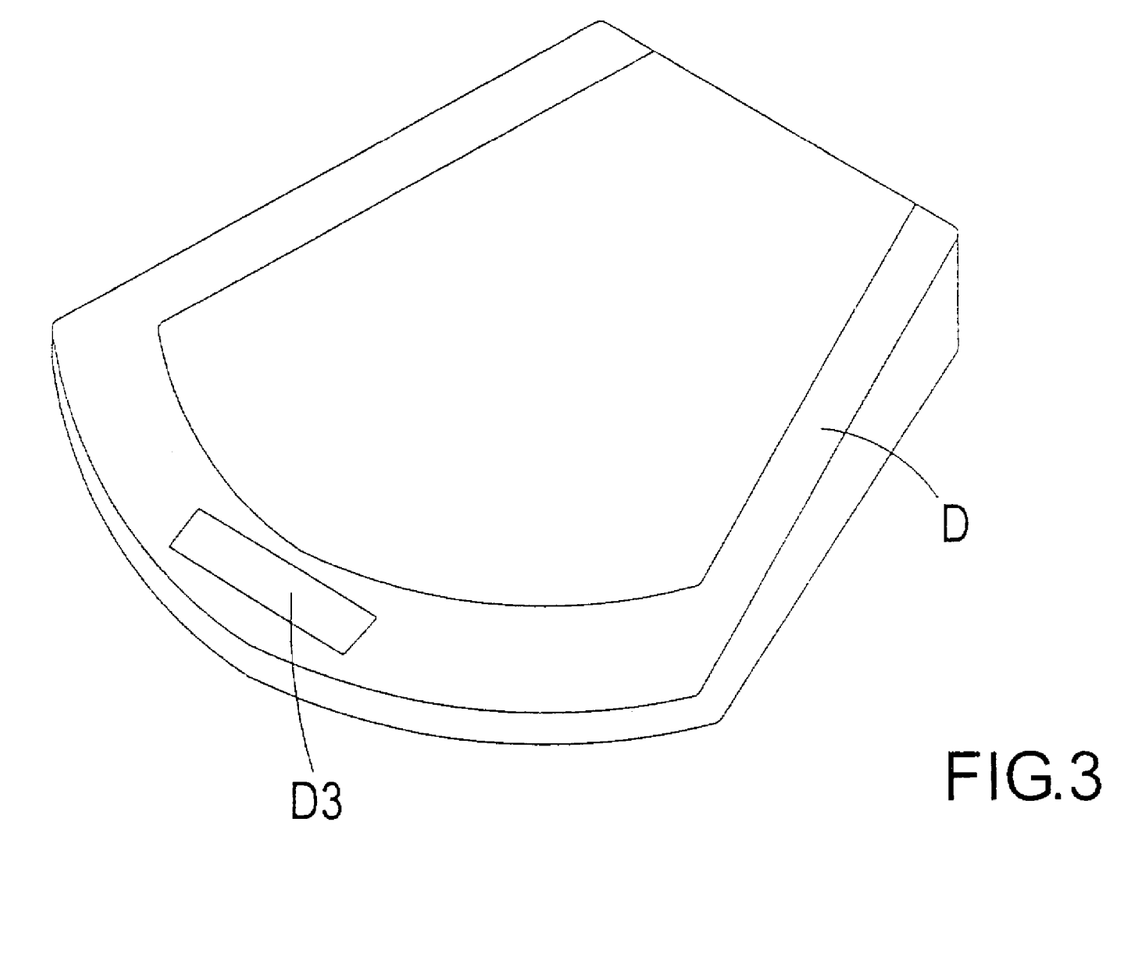
FIG. 3 is a perspective drawing of the receiver in the present invention.
Figure 4:
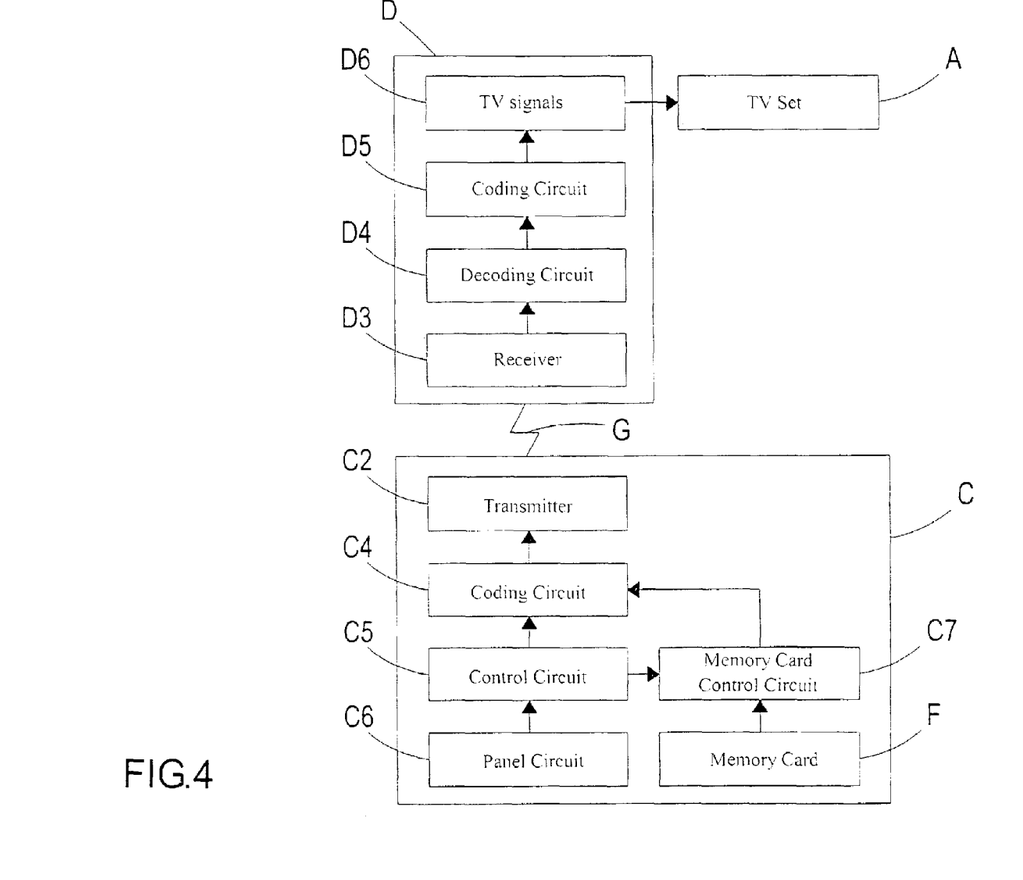
FIG. 4 is a functional block diagram of the present invention.

The present invention provides a multifunctional remote control device, as shown in FIGS. 2, 3, and 4, comprising a panel keyboard (C1), a transmitter (C2), a memory card slot (C3), a coding circuit (C4), a control circuit (C5), a panel circuit (C6) and a memory card control circuit (C7); a receiver (D) comprises a power source joint (D1), a signal joint (D2), a receiving device (D3), a decoding circuit (D4) and a coding circuit (D5).

It characterizes that after inserting a memory card (F) in the memory card slot (C3), the memory card control circuit (C7) instantly reads the audio/visual data in the memory card (F), commands are sent to the control circuit (C7) via the panel circuit (C6) from the buttons of the panel keyboard (C1). Said control circuit (C5) then drives the memory card control circuit (C7) sending the audio/visual data to coding circuit (C4). It translates the data into wireless signals (G) which are sent by the transmitter (C2) to the receiving device (D3) of the receiver (D). The decoding circuit (D4) thereof translates wireless signals (G) into audio/visual data which is input to the coding circuit (D5) and translated to TV signals (D6) receivable by a television set (A). The TV signals (D6) are directed to the television set (A) from the signal joint (D2) at the rear side of the receiver (D) and output from screen and speakers. A power source joint (D1) is also disposed at the rear side of the receiver (D) for the power supply of the receiver (D).

Said panel keyboard (C1) commands viewing functions such as forwarding, rewarding, volume, reversing, of the audio/visual data through the control circuit (C5). Moreover, the memory card control circuit (C7) thereof reads digital media files such as MPEG2, MPEG3, MPEG4, AVI, RM, JPG, BMP.

The wireless signals herein (G) are the agent and signal transportation systems and can be further applied in wireless data transmission such as infrared, radio and Bluetooth.

The memory card slot (C3) herein can be applied further as the storage agent for digital data in portable electronics such as CF card and MD card.

The signal joint (D2) of said receiver (D) can be set as joint applied in the input of TV signals such as S-SVIDO and AV terminal.

Figure 6:
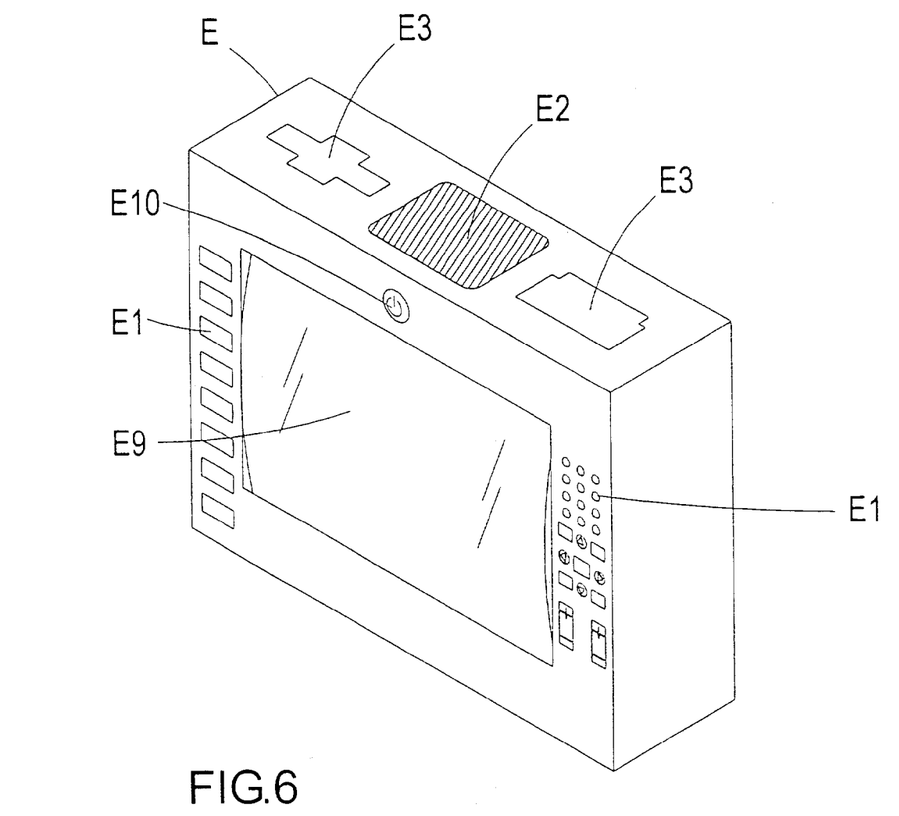
FIG. 6 is a perspective drawing of a further preferred embodiment of the remote control of the present invention.
Figure 7:
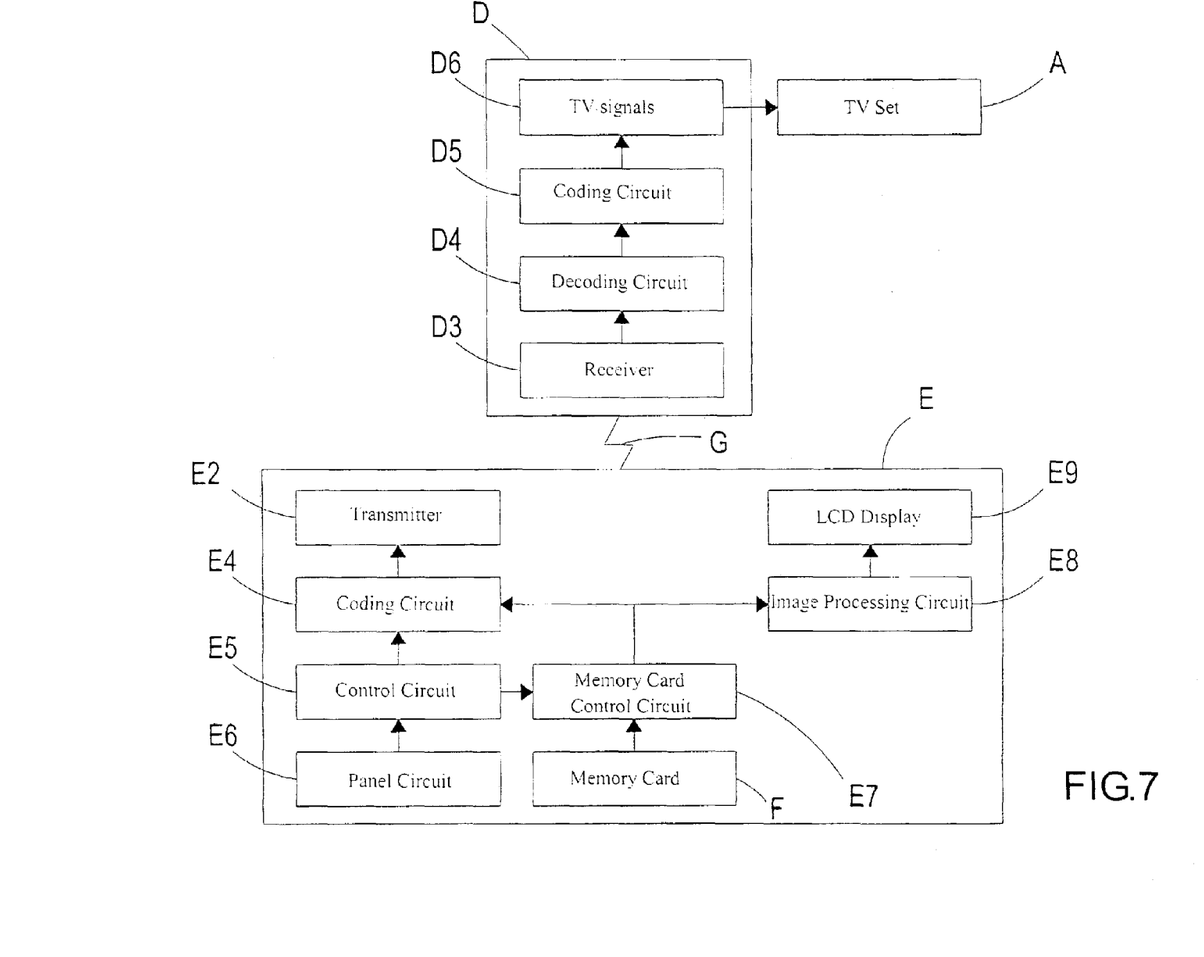
FIG. 7 is a functional block diagram of a further preferred embodiment of the present invention.
Figure 31:
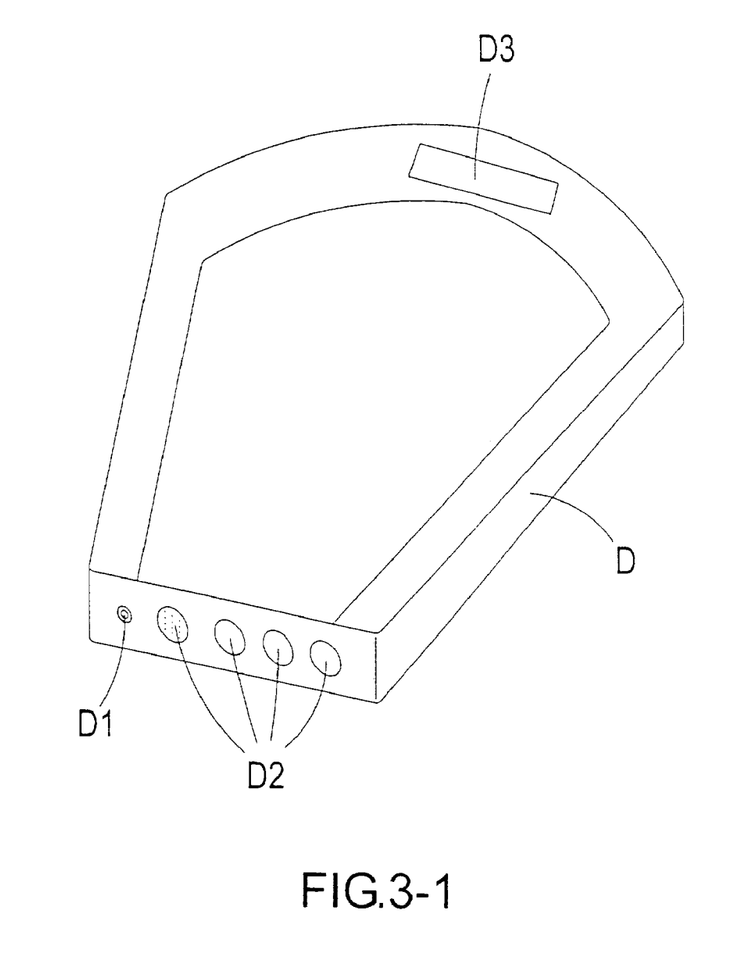

Referring FIGS. 6 and 7, the remote control (C) of the present invention is able to equip LCD display function comprising panel keyboard (E1), transmitter (E2), memory card slot (E3), coding circuit (E4), control circuit (E5), panel circuit (E6), memory card control circuit (E7), image processing circuit (E8), LCD display (E9) and power button (E10).

The feature of the said LCD display function is that after the memory card (F) is inserted into the memory card slot (E3), the memory card slot (E3) instantly reads the audio/visual data in the memory card (F), and commands are sent to control circuit (E5) from the control button on the panel keyboard (E1) via the panel circuit (E6). The control circuit (E5) drives the memory card control circuit (E7) sending the audio/visual data to the coding circuit (E4) which translates the data into wireless signals (G) transmitted by the transmitter (E2). Said wireless signals (G) are then picked up by the receiving device (D3) of the receiver (D), translated into audio/visual data by the decoding circuit (D4) and input to the coded circuit (D5). Said coded circuit (D5) translates the audio/visual data into TV signals receivable by the television set (A), which are input to the television set (A) and output from screen and speakers. When the LCD display (E9) is not in use, the power button (E10) controls the on/off the LCD display (E9).

The memory card control circuit (E7) simultaneously sends audio/visual data to LCD display (E9) through the image processing circuit (E8), and thereby the data is shown simultaneously from the LCD display (E9) and the television set (A).

Figure 5:
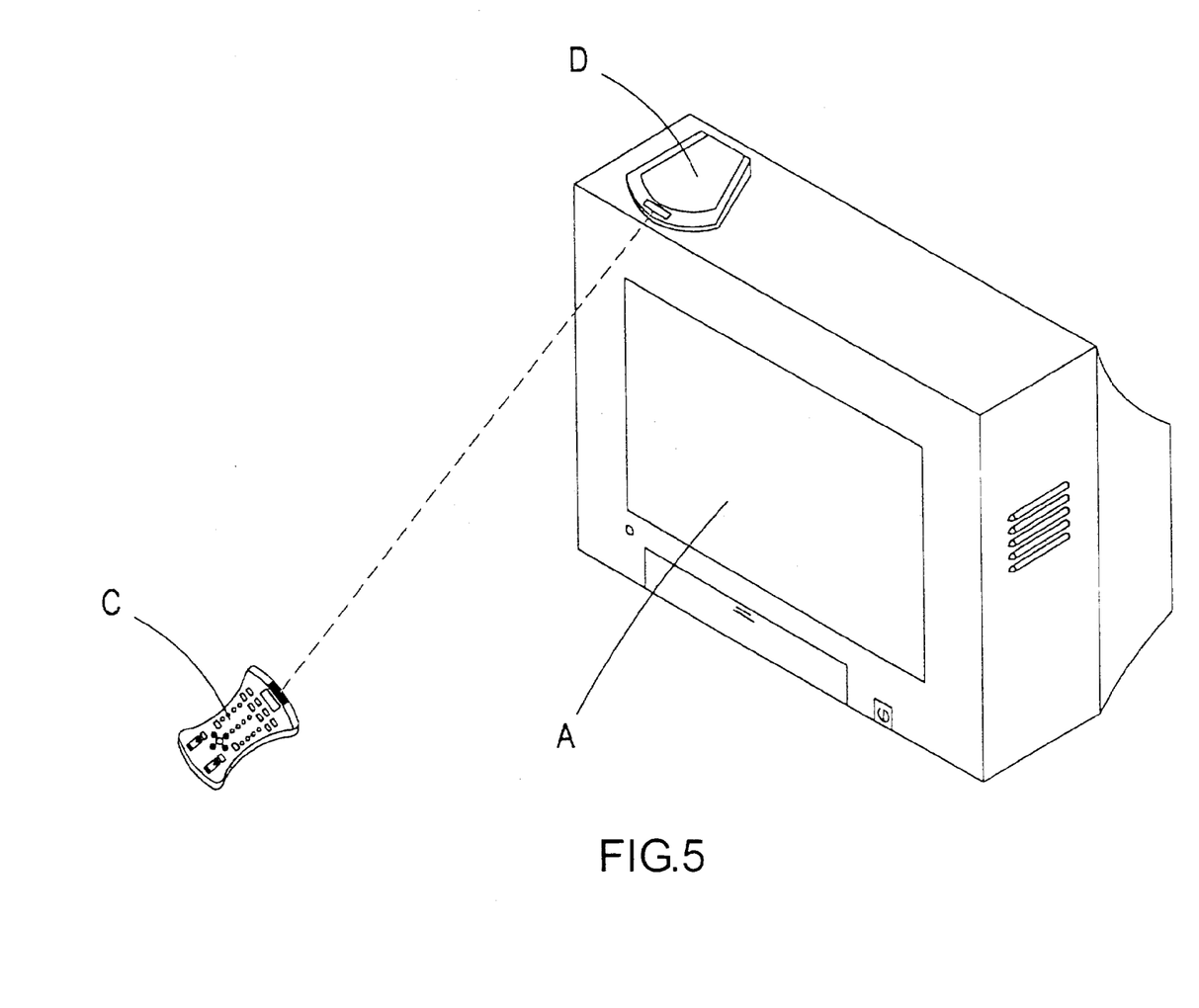
FIG. 5 is a schematic drawing of a preferred embodiment of the present invention.

The present invention provides a multifunctional remote control device, as shown in FIG. 5. The audio/visual data read by a remote control (C) is sent to a receiver (D) in the form of wireless signals (G). The audio/visual data is sent to the television set (A) from a signal joint (D1) of said receiver (D) via a transmission cable (H) and displayed by the television set (A).

For emphasizing the advance and practicality of the present invention, a comparison of the present invention and conventional product is made as follows:

Disadvantages of Conventional Product
1. It is equipped with only single function without variety.
2. It can not be integrated with digital products.
3. Computer or relative equipments are required when viewing digital images, which is inconvenient.

Advantages of Present Invention
1. The data in the memory card is read by the remote control, sent to the receiver and displayed by the television set.
2. The memory card slot is highly compatible, so it is convenient to use.
3. The receiver can be used in all types of television sets.
4. It is simple to control and connect.
5. It reads digital audio/visual data in various formats and highly compatible.
6. It is advanced and practical.
7. It is more competitive in industry.

To sum up, the present invention has been described with preferred embodiments thereof and it is understood that many changes and modifications in the described embodiments can be carried out without departing from the scope and the spirit of the invention that is intended to be limited only by the appended claims.

The invention claimed is:

1. A multifunctional remote control device comprises a panel keyboard, a transmitter, a receiver, a memory card slot a coding circuit, a control circuit, a panel circuit and a memory card control circuit; the receiver further comprises a power source joint, a signal joint, a receiving device, a decoding circuit and a coding circuit; is characterized in that:

after inserting a memory card in said memory card slot, said memory card control circuit instantly reads the audio/visual data in the memory card; meanwhile the control button on the panel keyboard directs the commands to said control circuit through said panel circuit; said control circuit drives the memory card control circuit to send audio/visual data to said coding circuit which translates said data to wireless signals; the wireless signals are then sent by said transmitter and picked up by the receiving device of the receiver; a decoding circuit translates the wireless signals to audio/visual data and inputs the data to said coding circuit which translates the data to TV signals receivable by a television set; said TV signals are input to the television set through the signal joint at the rear side of the receiver and output from a screen and speakers; the power source joint disposed at the rear side of the receiver is for the power supply; said panel keyboard sends forwarding, rewarding audio/visual viewing commands and volume through the control circuit;

said memory control circuit reads digital media files including MPEG2, MPEG3, MPEG4, AVI, RM, JPG, BMP.

2. A multifunctional remote control device according to claim 1, wherein LCD display is implemented, comprising said panel keyboard, said transmitter, said memory card slot, said coding circuit, said control circuit, said panel circuit, said memory card control circuit, a image processing circuit, a LCD screen, and a power button; said memory card control circuit sends audio/visual data to said LCD display through the image processing circuit, and thereby said LCD display shows audio/visual data simultaneously with the TV set.

3. A multifunctional remote control device according to claim 2, wherein said transmitter and receiver transmit wireless data using agents including infrared, radio, Bluetooth.

4. A multifunctional remote control device according to claim 2, wherein said memory card slot is also compatible with CF cards, MD cards and portable digital storage agents.

5. A multifunctional remote control device according to claim 2, wherein the signal joint of said receiver is a joint for the input of TV signals including S-SVIDO and AV joint.

6. A multifunctional remote control device according to claim 1, wherein said transmitter and receiver transmit wireless data using agents including infrared, radio, Bluetooth.

7. A multifunctional remote control device according to claim 1, wherein said memory card slot is also compatible with CF cards, MD cards and portable digital storage agents.

8. A multifunctional remote control device according to claim 1, wherein the signal joint of said receiver is a joint for the input of TV signals including S-SVIDO and AV joint.

* * * * *